United States Patent
Knapp (10) Patent No.: US 8,384,790 B2
(45) Date of Patent: Feb. 26, 2013

(54) VIDEO IMAGE ENHANCEMENT METHOD AND APPARATUS USING REFERENCE AND AUXILIARY FRAMES

(75) Inventor: Verna Knapp, Monmouth, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2827 days.

(21) Appl. No.: 10/227,059

(22) Filed: Aug. 20, 2002

(65) Prior Publication Data

US 2004/0036782 A1    Feb. 26, 2004

(51) Int. Cl.
*H04N 5/225*    (2006.01)
*H04N 5/228*    (2006.01)

(52) U.S. Cl. .................................. 348/222.1; 348/207.1

(58) Field of Classification Search ............... 348/207.1, 348/222.1, 231.3, 231.6, 231.99, 620; 382/283
See application file for complete search history.

(56) References Cited

U.S. PATENT DOCUMENTS

| | | | | | |
|---|---|---|---|---|---|
| 5,657,402 | A | * | 8/1997 | Bender et al. | 382/284 |
| 5,784,115 | A | * | 7/1998 | Bozdagi | 348/452 |
| 6,122,017 | A | * | 9/2000 | Taubman | 348/620 |
| 6,317,141 | B1 | * | 11/2001 | Pavley et al. | 715/732 |
| 6,680,748 | B1 | * | 1/2004 | Monti | 348/220.1 |
| 7,027,086 | B1 | * | 4/2006 | Ozawa et al. | 348/220.1 |
| 2004/0091232 | A1 | * | 5/2004 | Appling, III | 386/46 |

* cited by examiner

*Primary Examiner* — Daniel M Pasiewicz (57) ABSTRACT

A video sequence is enhanced by selecting a reference video frame and at least one auxiliary video frame from the video sequence. The information from the reference frame and the auxiliary frame are combined based on measurements of the displacement of objects between the reference frame and each of the auxiliary video frames. Video and multimedia presentations are then generated using the enhanced video frame combining information from the reference video frame and the at least one auxiliary video frame.

8 Claims, 6 Drawing Sheets

VIDEO IMAGE ENHANCEMENT METHOD AND APPARATUS USING REFERENCE AND AUXILIARY FRAMES

BACKGROUND OF THE INVENTION

An increasing number of devices take video sequences using lower resolution to conserve storage requirements or less acuity to save on hardware costs. The resulting video sequence is also compressed to further save storage space. For example, many digital still cameras (DSC) have the ability to take short videos in addition to traditional still photos. These short videos capture a few moments of video information at lower resolution and sometimes with noticeable compression artifacts. Typically, the DSC records at a lower resolution of 320×240 pixels and at a lower frame rate of 10 or 15 frames per second. Typical formats for holding this information are compatible with JPEG, Motion JPEG, mpeg1, QuickTime or AVI files.

The ability to record brief moments of video is a useful feature. In many cases, a brief video can be used to capture an event better seen with movement or as a movie. For example, sporting events or recording important family moments are better captured in video. Unfortunately, the lower resolution and artifacts in the conventional DSC and other devices has made these video recording features more of a novelty than a useful feature. As a result, the video recording feature on some DSC and other devices frequently are not used. Many people would prefer to purchase a lower cost DSC or other device and save money than receive conventional lower quality video recordings.

DETAILED DESCRIPTION

Aspects of the present invention are used to improve the quality and acuity of frames in a video sequences. In digital photography, video quality is sometimes degraded due to digital artifacts, optical aberrations, or other types of imperfections related to electronic circuitry or hardware. Implementations of the present invention utilize multiple frames in a sequence of video frames to enhance the resulting video sequence and ameliorate these effects. Objects moving in one or more of the frames in the video sequence are analyzed and used to improve a reference frame which is then enhanced. Enhanced reference frames replace the original reference frames improving the overall video sequence.

Costly hardware is not required as the video sequences are enhanced using software and information contained within the video sequence. Further, these enhancement operations made on the video sequence can be performed within the video recording device or through post-processing operations performed on a computer device after the video sequence has been shot. As a result, initially lower quality video recordings can be enhanced in accordance with implementations of the present invention and transformed into useful content for multimedia presentations or personal recordings. Of course, these are just some of the many advantages and uses when enhancing video sequences in accordance with implementations of the present invention.

Figure 1:
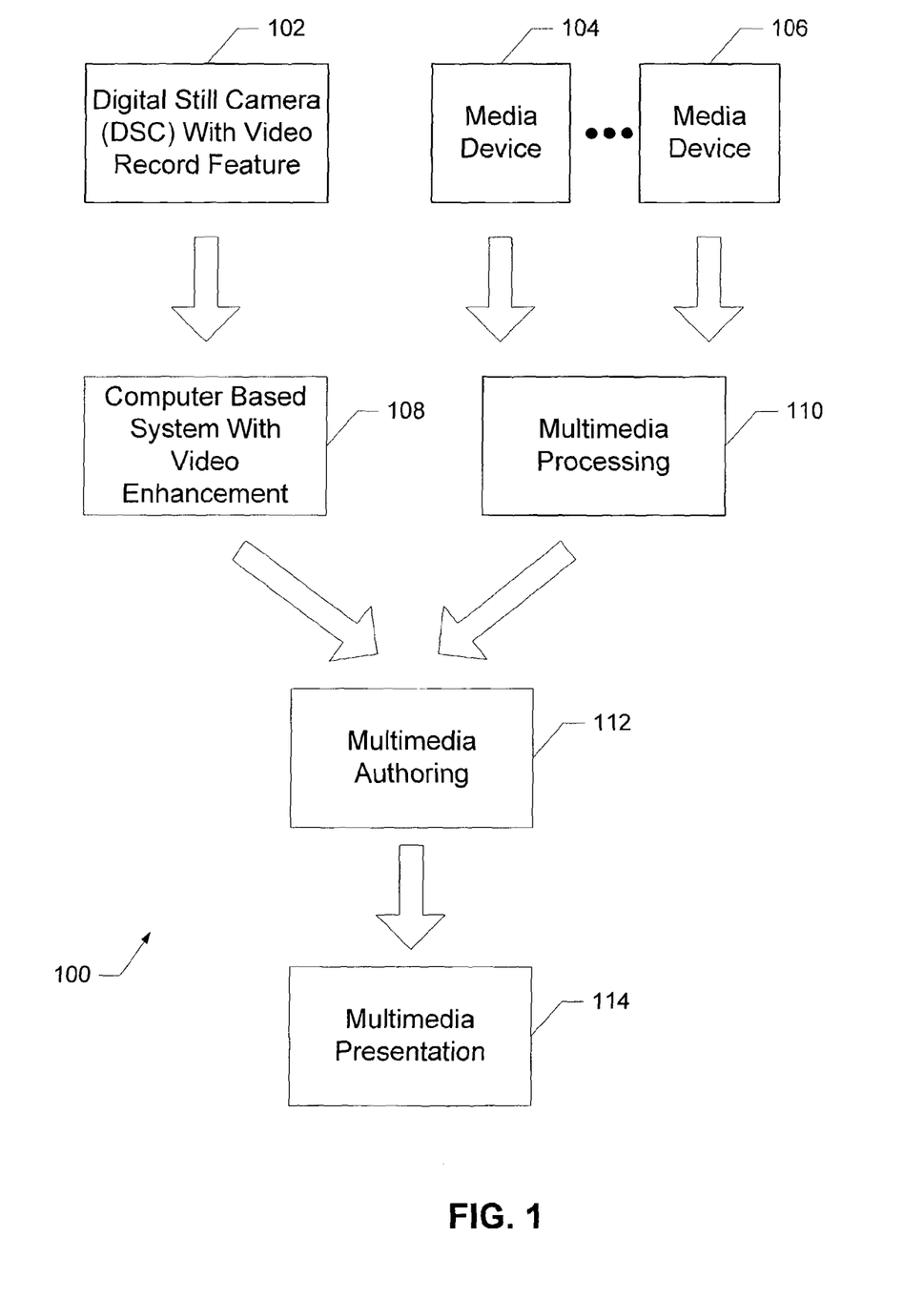
FIG. 1 is a block diagram of a system used to process multimedia information and enhance a video sequence in accordance with one implementation of the present invention.

FIG. 1 is a block diagram of a system 100 used to process multimedia information and enhance a video sequence in accordance with one implementation of the present invention. System 100 includes a digital still camera (DSC) 102 with video record features, media device 104 through media device 106, computer based system with video enhancement 108, multimedia processing 110, multimedia authoring 112, and multimedia presentation 114. One or more hardware or software subsystems can be used to implement system 100. For example, media device 104 or media device 106 can each be different types of audio recorder devices recording audio information processed through a digital signal processing device identified in as multimedia processing 110. Each component in system 100 can be contained in separate devices or integrated into one hardware device, namely, DSC 102 having these additional functions.

In this example implementation, DSC 102 provides digital still information along with the option of providing a video sequence enhanced in accordance with implementations of the present invention. These video sequences generated by DSC 102 are generally either mpeg1, QuickTime, or AVI style files compressed with photo JPEG or Motion JPEG. Many times these video sequences are shorter in time and with lower resolution to save storage space on the video devices. For example, a typical video sequence shot using DSC 102 is done at 320×240 pixel resolution and at 10 to 15 frames per second (fps). Alternate implementations of the present invention can be used to improve both higher or lower resolution photos taken at either higher or lower frame rates.

Computer based system with video enhancement 108 (hereinafter computer enhancement system 108) designed in accordance with the present invention provides an enhanced and improved video sequence. As depicted in FIG. 1, the enhancement processing takes place on a separate computer device for convenience and a lower-cost and smaller form factor DSC 102. Alternatively, however, this processing could take place on a processor device embedded in DSC 102 and programmed to enhance the video sequence in accordance with the present invention as it is taken or shortly after the video sequence has been recorded.

Both computer enhancement system 108 and multimedia processing 110 provide content to multimedia authoring 112 for further editing and combining. In multimedia authoring 112 are tools and operations that combine and, in some cases, provide synchronization between different types of media. For example, enhanced video sequences from computer enhancement system 108 can be combined with audio content and other multimedia information provided through multimedia processing 110. Other operations on multimedia authoring 112 include mastering information with compression and encryption for placement on a removable media storage device including, for example, CD-ROM, DVD and other storage mediums. Alternatively, it may include delivering a signal containing the combined and processed multimedia information directly to a peripheral device for display or for storage on another remotely located storage medium instead of direct storage on CD-ROM, DVD and other storage mediums.

Multimedia presentation 114 represents various devices for presenting the information created using multimedia authoring 112. To accommodate audio, video, and image information, multimedia presentation 114 is equipped with sound and visual generation devices suitable for providing the corresponding multimedia information. Accordingly, multimedia presentation 114 can be a television device with a video or DVD read/write device, CD-ROM, or real-time satellite feed with information generated in accordance with aspects of the present invention. Signal from video, DVD, CD-ROM, real-time satellite feed can pass audio signals through the television device or a entertainment theatre sound system. For example, multimedia presentation 114 can be a television device playing a DVD or CD-ROM mastered using the enhanced video sequence in accordance with the present invention and having audio and audible information.

Figure 2:
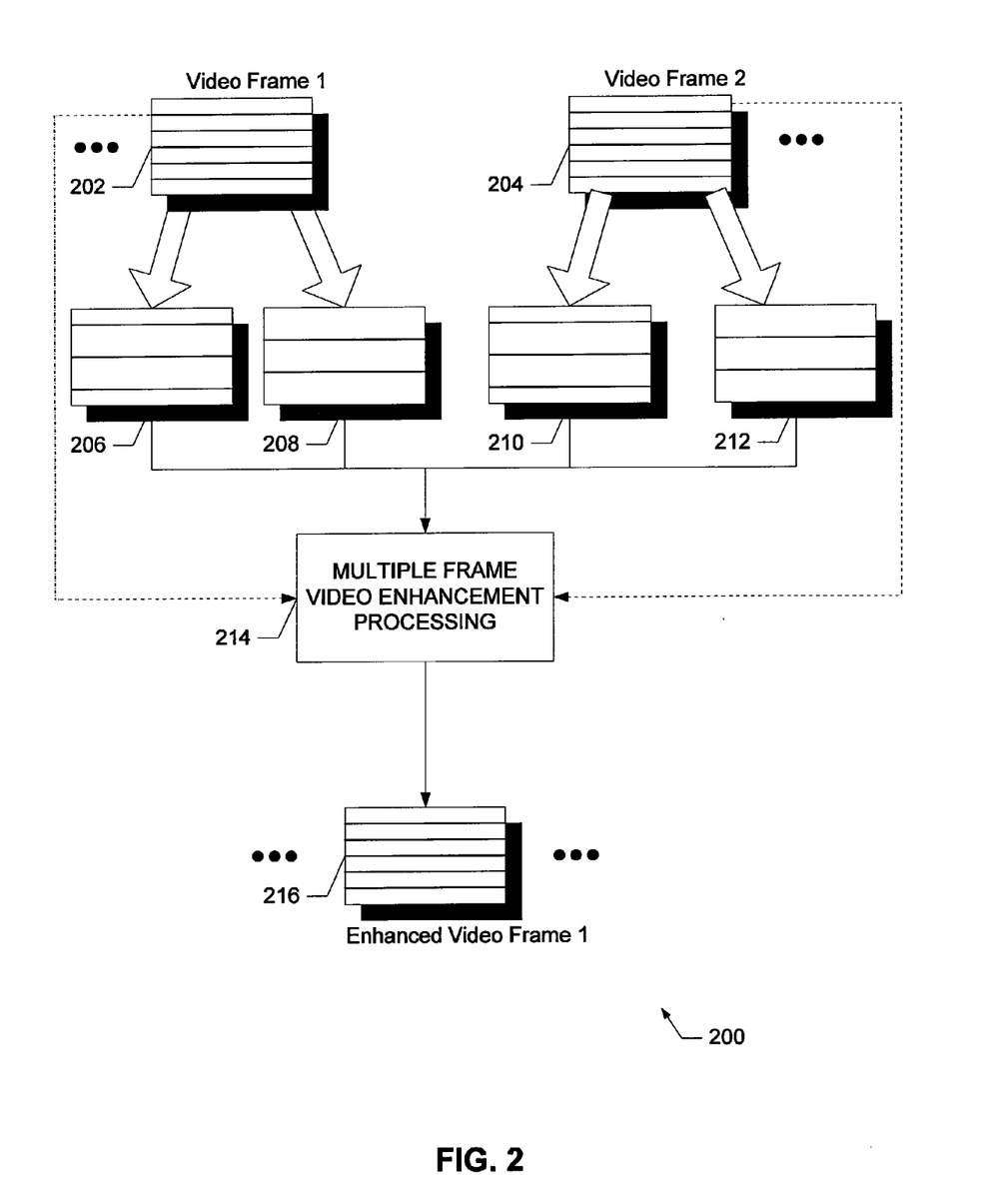
FIG. 2 is a block diagram of the structures used in creating an enhanced video sequence in accordance with one implementation of the present invention.

FIG. 2 is a block diagram of the structures used in creating an enhanced video sequence in accordance with one implementation of the present invention. In this example, a reference frame 202 is combined with one auxiliary frame 204 and enhanced in accordance with one implementation of the present invention. In practice, however, the enhancement is performed on each video frame in the sequence and can use two or more frames to achieve the desired enhancement results. The number of frames used during the enhancement operation depends on the processing power available, the time constraints for performing the enhancement, and the quality of enhancement desired for the enhanced video sequence. For example, using two frames (i.e., reference frame 202 and auxiliary frame 204) as depicted in FIG. 2 provides acceptable enhancement results in accordance with the present invention with lower costs and processing requirements; processing more than two frames increases processing requirements but potentially produces a better enhanced video sequence.

Reference frame 202 and auxiliary frame 204 are each divided into two frames compatible with interlaced video typically used with television and other interlaced video technologies. This "false interlace" operation splits every other scan line in reference frame 202 into odd reference frame 206 and even reference frame 208; similarly, auxiliary frame 204 is divided into odd auxiliary frame 210 and even auxiliary frame 212.

If computer monitors or other non-interlaced video transmission are used then the false interlace operations are not required and both reference frame 202 and auxiliary frame 204 are processed directly by multiple frame enhancement processing 214 which is described in further detail later herein. Performing these operations generates enhanced video frame 216 and is then used to replace reference frame 202 in the video sequence. To complete this enhancement process, the above operations are performed on each frame in the video sequence with the exception of the last reference frame in the sequence as it lacks subsequent auxiliary frames for combining.

Figure 3:
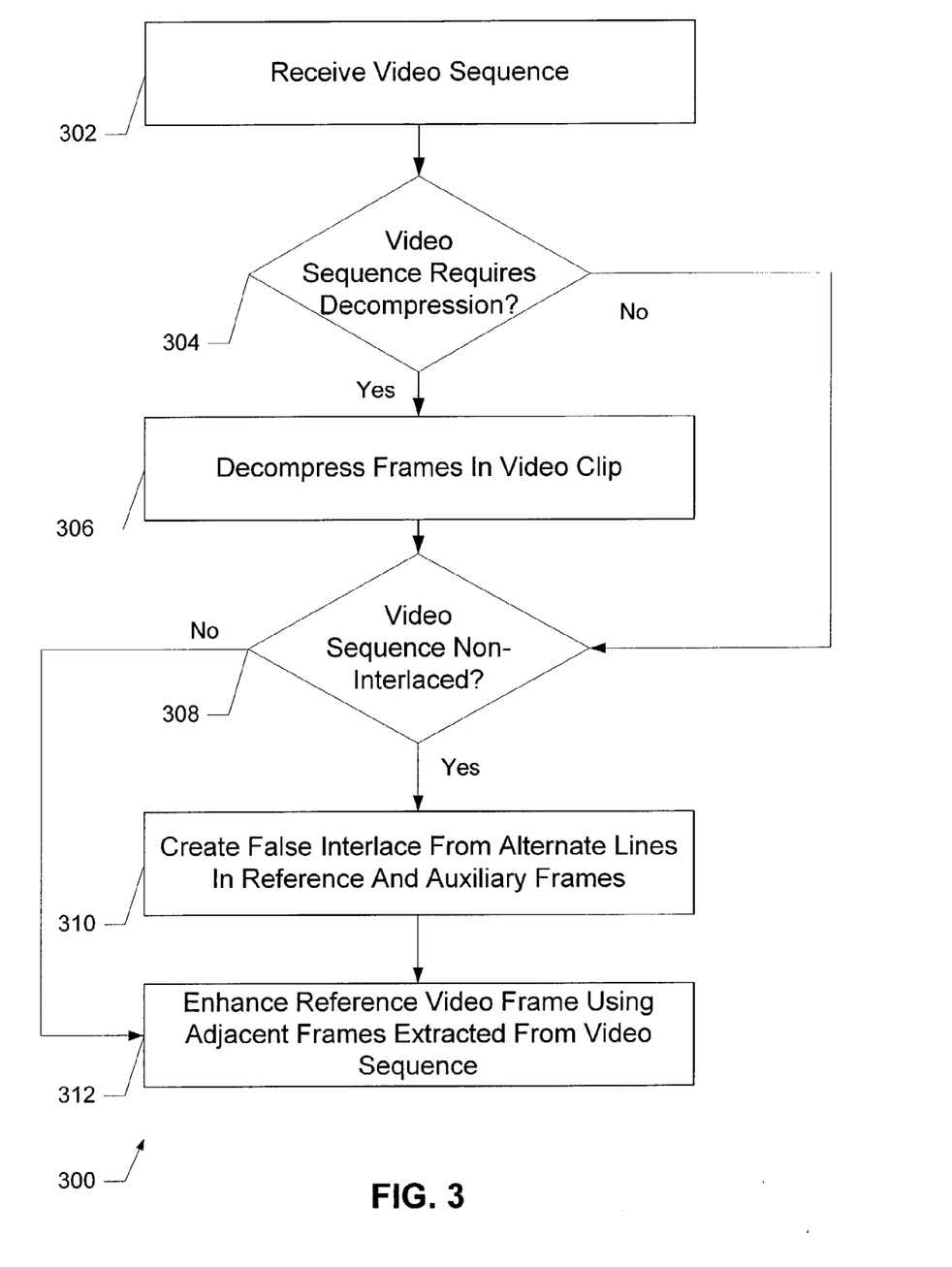
FIG. 3 is a flow chart diagram of the operations for enhancing a video sequence in accordance with one implementation of the present invention.

FIG. 3 is a flow chart diagram of the operations for enhancing a video sequence in accordance with one implementation of the present invention. Video enhancement operation 300 receives a video sequence clip from a video recording device (302). This video sequence can be delivered and buffered for real-time processing or can be stored in file system or other storage area for post-process enhancement in accordance with aspects of the present invention.

Several operations involve preparing and formatting the video frames prior to combining the video frames. Enhancement operation 300 determines if the video sequence is compressed (Yes in 304) and performs decompression as needed with the appropriate processing (306). Video frames are generally formatted according to mpeg1, QuickTime, or AVI style files and compressed with photo JPEG or Motion JPEG or other appropriate compression technologies. If video frames are not compressed (No in 304), compression or decompression related operations are bypassed.

Television or other interlaced video technologies using video enhancement implementations of the present invention may require the video to be represented as interlaced video frames. If the video frames are not initially interlaced (Yes in 308), they are processed through a false interlace process using alternate lines in certain frames in the video sequence (310). For example, the false interlace is applied to a reference frame selected for enhancement and an auxiliary frame selected to be combined with the reference frame as previously described.

Once the video frames are formatted properly, enhancement operation 300 combines one or more auxiliary frames with the reference frame to generate the enhanced reference frame. The combination operation uses a motion map to model the displacement between the reference frame and the one or more auxiliary frames (312).

Figure 4:
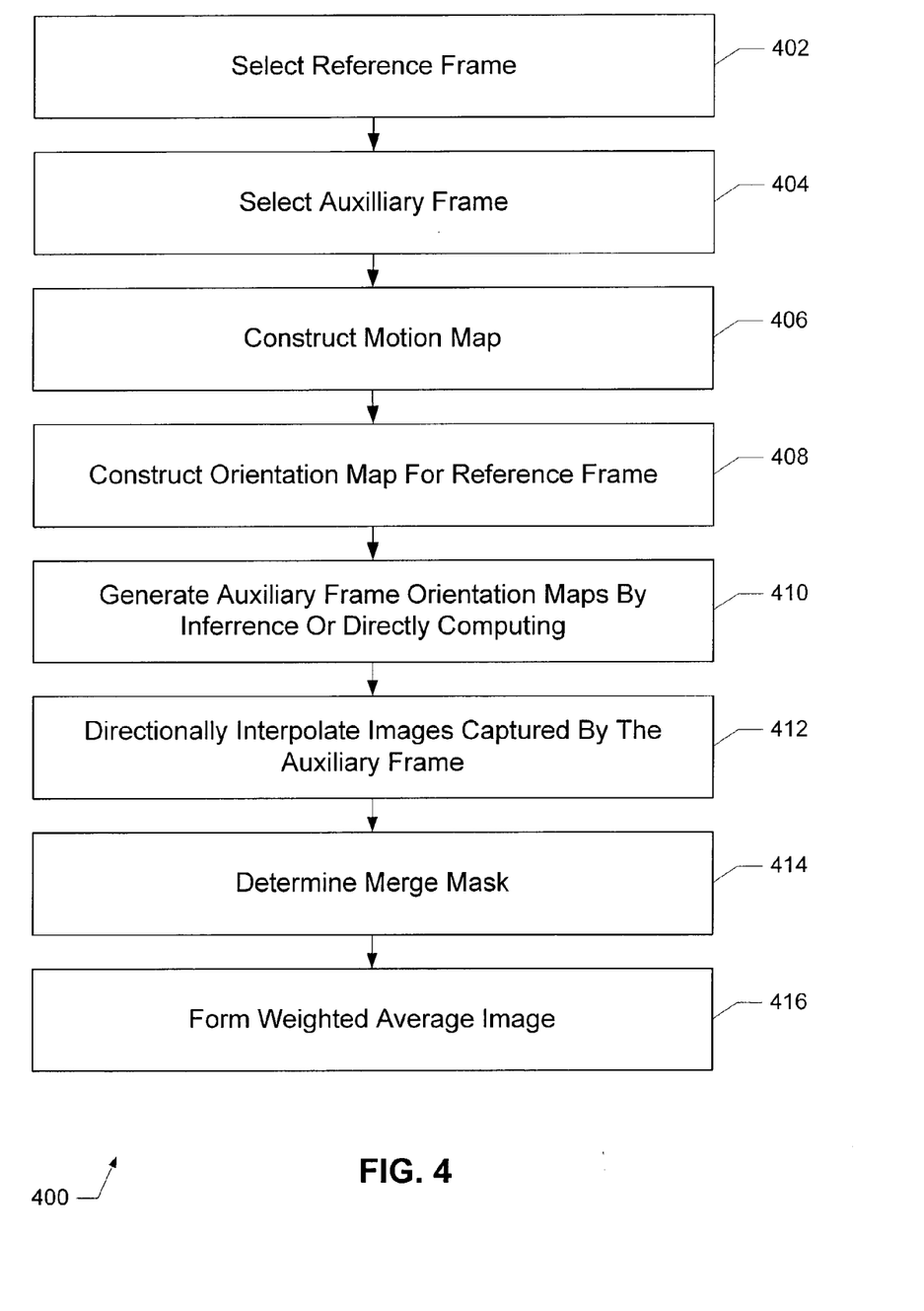
FIG. 4 is a flow chart diagram providing the operations for combining a reference frame with one or more auxiliary frames in accordance with one implementation of the present invention.

FIG. 4 is a flow chart diagram providing the operations for combining a reference frame with one or more auxiliary frames in accordance with one implementation of the present invention. Combination operation 400 initially selects a reference frame for enhancement (402) and auxiliary frames to combine with the reference field during the enhancement process (404). For example, the first frame in the video sequence is selected as the initial reference frame and one or more subsequent fields are selected as the auxiliary frames. Once the first reference frame is processed, additional reference and auxiliary frames are selected from subsequent frames in the video sequence and enhanced in accordance with implementations of the present invention. Generally, all but the last frame in a video sequence is enhanced as there are no subsequent auxiliary frames to process and combine with the last frame in the video sequence.

Combination operation 400 continues by constructing motion maps and motion vectors describing the displacement of objects between the reference frame and at least one auxiliary frame (406). In one implementation, the reference frame is further divided into rows and columns of non-overlapping segmentation blocks. A slightly larger motion block surrounds each segmentation block detecting scene objects moving between the reference frame and at least one auxiliary frame. Motion vectors describe the displacement of objects within the motion blocks and between the reference frame and the auxiliary frame. These motion vectors assist in merging the information from the reference frame with the auxiliary frame and described in further detail later herein.

In addition, combination operation 400 further defines the construction of an orientation map for the reference frame. Construction of the orientation map for the reference field (408) identifies the direction of edges of the objects within the neighborhood of a given pixel to facilitate directional interpolation of reference frame image information. For example, the orientation map includes a set of eight orientation classes identifying the orientation of an edge or if the orientation cannot be identified then indicating that the edge does not have a distinct orientation. In general, combination operation 400 processes both luminance and chrominance components of the frames in the video sequence.

Regarding the auxiliary frames, orientation maps for the auxiliary frames are computed directly or inferred from information associated with reference frames (410). Like the reference frames, the auxiliary frames are also directionally interpolated once the orientation of the image edges are identified (412). Both interpolated reference frames and interpolated auxiliary frames are merged using information and create the enhanced reference image used in the enhanced video sequence.

Merging of the interpolated frames creates a high-quality image for use in the enhanced video sequence. The merging process is performed on each individual motion block described previously and then stitched together using a smooth transition function within overlapping regions of the motion blocks. In operation, a merge mask is determined for each auxiliary frame (414) identifying regions of pixels in the reference frame and the auxiliary frame not to include in the final enhanced image. In these regions, motion between the reference frame and the auxiliary frame can be described by the motion vector.

Combination operation 400 applies a weighted average to each interpolated pixel in the reference frame and auxiliary frame to create a weighted average image (416). The weighted average determines the contribution made by pixels in the reference frame and by each of the one or more auxiliary frames. One method of processing a reference frame and an auxiliary frame is described in U.S. Pat. No. 6,122,017 entitled, "Method for Providing a Motion-Compensated Multi-Field Enhancement of Still Images from Video", Issued Sep. 19, 2000, assigned to the assignee of the present invention.

Figure 5:
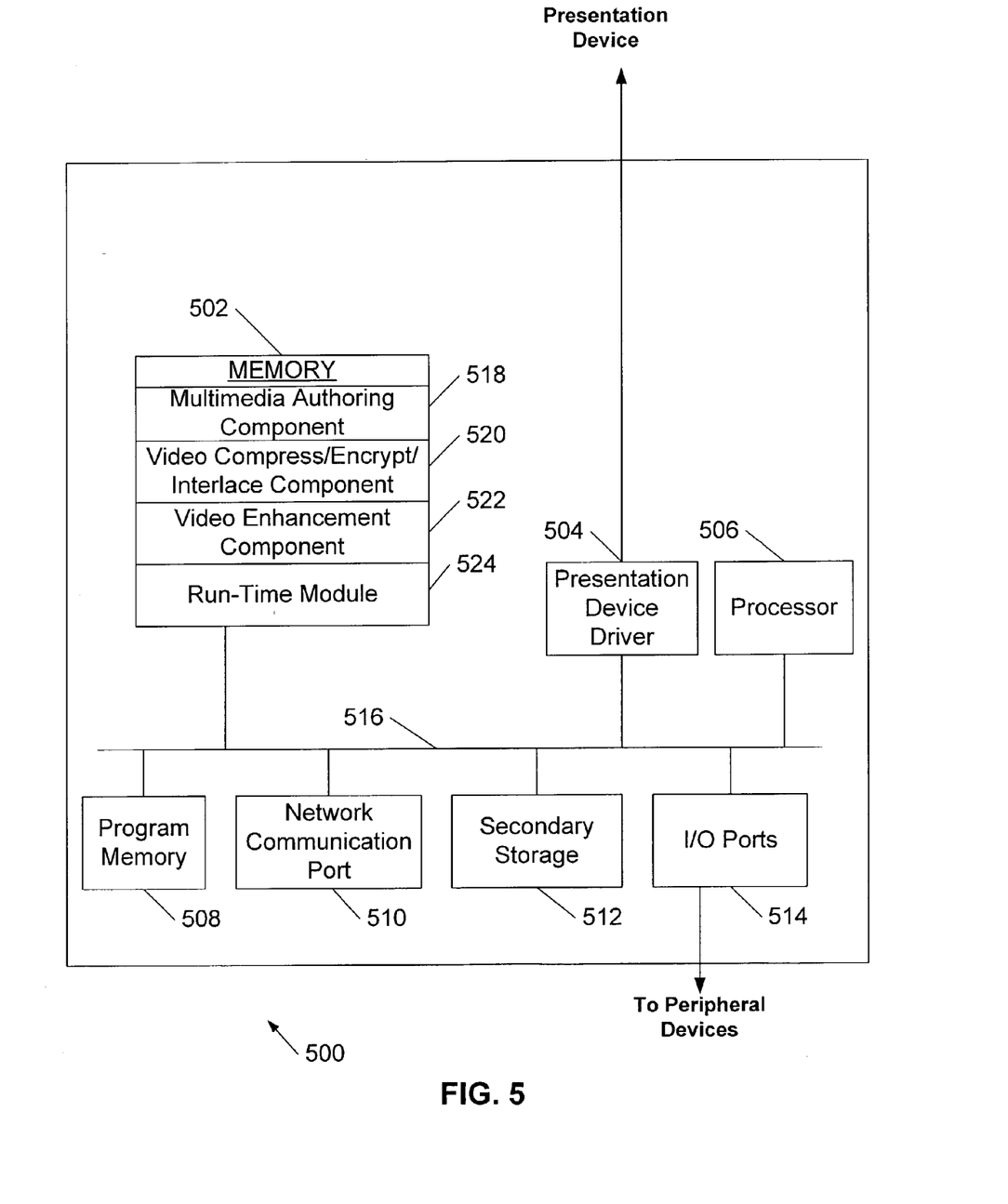
FIG. 5 is a block diagram of a system used by one implementation of the present invention for enhancing video sequences.

FIG. 5 is a block diagram of a system used by one implementation of the present invention for enhancing video sequences. In this example system 500 includes a memory 502, typically random access memory (RAM), a presentation device driver 504, a processor 506, a program memory 508 (for example, a writable read-only memory (ROM) such as a flash ROM), a network communication port 510, a secondary storage 512, audio and I/O ports 514 operatively coupled together over bus 516. System 500 can be preprogrammed, in ROM, for example, or it can be programmed (and reprogrammed) by loading a program from another source (for example, from a floppy disk, a CD-ROM, or another computer).

Memory 502 includes a multimedia authoring component 518, a video compress/encrypt/interlace component 520, a video enhancement component 522, and a run-time module 524. Multimedia authoring component 518 receives a video sequence enhanced in accordance with one implementation of the present invention and provides tools and operations for combining this video sequence with one or more tracks of audio and other visual effects as needed to produce multimedia presentations for personal or commercial use. Video compress/encrypt/interlace component 520 provides another set of tools and operations for pre-processing and post-processing the enhanced video sequence for integration with existing multimedia formats and systems. Video enhancement component 522 performs operations for enhancing a video sequence using other frames in the video sequences as described previously and in accordance with various implementations of the present invention. To facilitate performing these operations on computer system, run-time module 524 allocates resources from memory, storage area, and processor time-slices to these and other operations. For example, run-time module 524 can be based on a real-time kernel of an operating system or can be preemptive operating system having fewer real-time operating characteristics.

Presentation device driver 504 provides digital and/or analog signal output to an image generation device such as a display or a printer. In one implementation, video sequences are carried by the digital and/or analog signal output enhanced in accordance with implementations of the present invention. Alternatively, presentation device driver 504 can provide enhanced still images in addition to enhanced video sequences or can include a combination of both still images and video sequences both enhanced in accordance with implementation of the present invention. Further, both still images and video sequences can also be printed on paper, slides or other visual mediums and can include text in the images or video sequences, in addition to other types of information.

Secondary storage 512 is suitable for storing executable computer programs, including programs embodying the present invention, and data including buffers and temporary storage space as need to implement aspects of the present invention.

Input/output (I/O) ports 514 are coupled to system 500 over bus 516. Peripheral devices connected through I/O ports 514 may include audio ports generating analog and/or digital signals amplified for listening over an audio generation device like a speaker. Input/output ports facilitate the receipt and transmission of data (e.g., text, images, videos, and animations) in analog or digital form over communication links such as a serial link, local area network, wireless link, and parallel link. These input/output (I/O) 514 ports also facilitate communication with a wide variety of peripheral devices including keyboards, pointing devices (mouse, touchpad and touchscreen) and printers. Alternatively, separate connections (separate buses) can be used to interface with these peripheral devices using a combination of Small Computer Systems Interface (SCSI), Universal Serial Bus (USB), IEEE 1394/Firewire, Personal Computer Memory Card International Association (PCMCIA) or any other protocol suitable for interfacing with the peripheral device being attached to system 500.

Figure 6:
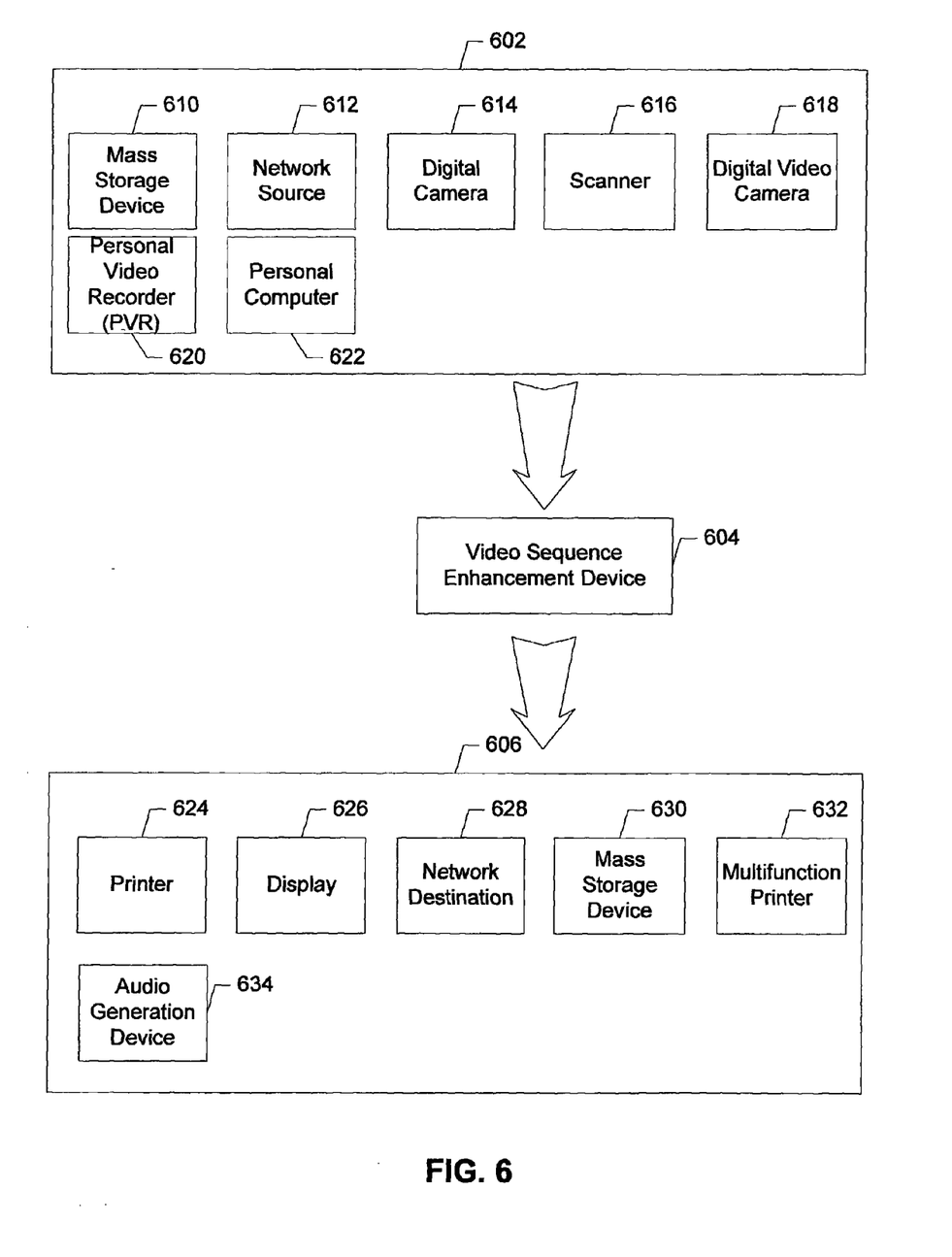
FIG. 6 is a block diagram illustrating a video sequence enhancement device capable of receiving video sequences from input devices and providing enhanced video sequences to output devices.

FIG. 6 is a block diagram illustrating a video sequence enhancement device 604 capable of receiving video sequences from input devices 602 and providing enhanced video sequences to output devices 606. Video sequence enhancement device 604 can be embedded as part of one or more input devices 602 or output devices 606. Instead of being embedded, video sequence enhancement device 604 can be a separate device connected to input devices 602 or output devices 606 over a bus or other connection device.

In this example, input devices 602 include mass storage device 610, network source 612, digital camera (with video capabilities) 614, scanner 616, digital video camera 618, personal video receiver (PVR) 620 and personal computer 622. Output devices 606 in this example include printer 624, display 626, network destination 628, mass storage device 630, multifunction printer 632 and audio generation device 634.

In operation, incoming streams of information from input devices 602 are enhanced by video sequence enhancement device 604 and passed to one or more of output devices 606. Audio information corresponding to the enhanced video sequence is played over audio generation device 634.

The invention can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device.

Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

To provide for interaction with a user, the invention can be implemented on a computer system having a display device such as a monitor or LCD screen for displaying information to the user and a keyboard and a pointing device such as a mouse or a trackball by which the user can provide input to the computer system. The computer system can be programmed to provide a graphical user interface through which computer programs interact with user.

Accordingly, the invention is not limited to the above-described implementations, but instead is defined by the appended claims in light of their full scope of equivalents.

What is claimed is:

1. A method of enhancing a video sequence, comprising:
    selecting a reference video frame and at least one auxiliary video frame from the video sequence;
    combining information from the at least one auxiliary video frame and information from the reference video frame; and
    generating an enhanced video frame as part of a series of enhanced video frames using the combined information from the reference video frame and the at least one auxiliary video frame;
    wherein the video sequence is taken using a digital still camera (DSC) with a video record feature; and
    wherein the video sequence is enhanced on the digital still camera (DSC).

2. A method of enhancing a video sequence, comprising:
    selecting a reference video frame and at least one auxiliary video frame from the video sequence;
    combining information from the at least one auxiliary video frame and information from the reference video frame; and
    generating an enhanced video frame as part of a series of enhanced video frames using the combined information from the reference video frame and the at least one auxiliary video frame; and
    wherein the video sequence is enhanced on a computer.

3. An apparatus for enhancing a video sequence, comprising:
    means for selecting a reference video frame and at least one auxiliary video frame from the video sequence;
    means for combining information from the at least one auxiliary video frame and information from the reference frame using motion maps modeling a displacement between the reference frame and each of the at least one auxiliary video frame; and
    means for generating an enhanced video frame as part of a series of enhanced video frames using the combined information from the reference video frame and the at least one auxiliary video frame.

4. A computer program product for enhancing a video sequence, tangibly stored on a computer-readable medium, comprising instructions operable to cause a programmable processor to:
    select a reference video frame and at least one auxiliary video frame from the video sequence;
    combine information from the at least one auxiliary video frame and information from the reference frame using motion maps modeling the displacement between the reference frame and each of the at least one auxiliary video frame; and
    generate an enhanced video frame as part of a series of enhanced video frames using the combined information from the reference video frame and the at least one auxiliary video frame.

5. A method for creating a multimedia presentation, comprising:
    receiving a video sequence from a digital still camera (DSC) and multimedia content from at least one other device;
    enhancing the video sequence by using information measuring a displacement between a reference video frame from the video sequence and each of the at least one auxiliary video frames from the video sequence; and
    combining the enhanced video sequence derived from a series of enhanced video frames with the multimedia content from the at least one other device suitable for a multimedia presentation; and
    wherein the video sequence is enhanced on the digital still camera (DSC).

6. A method for creating a multimedia presentation, comprising:
    receiving a video sequence from a digital still camera (DSC) and multimedia content from at least one other device;
    enhancing the video sequence by using information measuring a displacement between a reference video frame from the video sequence and each of the at least one auxiliary video frames from the video sequence; and
    combining the enhanced video sequence derived from a series of enhanced video frames with the multimedia content from the at least one other device suitable for a multimedia presentation; and
    wherein the video sequence is enhanced on a computer.

7. An apparatus for enhancing a video sequence, comprising:
    a memory having a run-time module for allocating resources and a video enhancement component for enhancing video sequences using information measuring a displacement between a reference frame from the video sequence and each of the at least one auxiliary video frames from the video sequence; and a processor capable of executing instructions associated with the video enhancement component in the memory and enhancing the video sequence made up of a series of enhanced video frames.

8. The apparatus of claim 7 wherein the memory further comprises:

a multimedia authoring component that combines the enhanced video sequence with one or more other types of media for presentation on a presentation device.

* * * * *